United States Patent Office 2,783,496
Patented Mar. 5, 1957

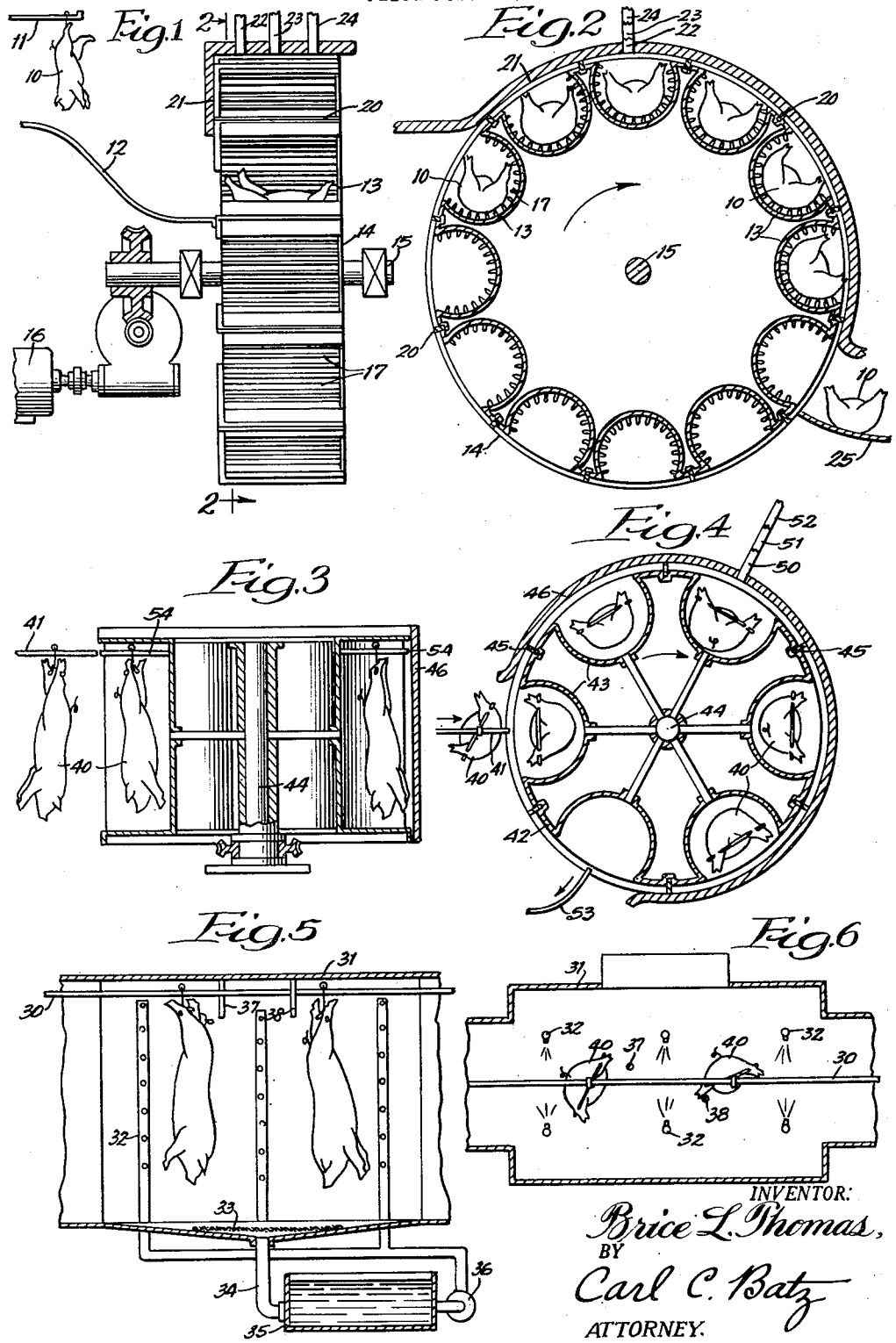

2,783,496

DEHAIRING PROCESS

Brice L. Thomas, Western Springs, Ill.

Application February 25, 1955, Serial No. 490,613

6 Claims. (Cl. 17—45)

This invention relates to an improved process for the removal of hair and other keratinous material from an animal carcass. In one of its aspects this invention relates to a process for loosening hair roots from the follicles on animal carcasses. In another of its aspects this invention relates to an apparatus for loosening the filamentary keartinous materials on animal carcasses.

In the meat packing industry it is the practice in the processing of pork to completely dehair the hog carcass after killing and before evisceration. The dehairing operation is an extremely significant one, having a direct effect on the grading of the meat on inspection, the cost of the operation and the profit to be made on the animal. The conventional method of dehairing a hog carcass involves first scalding by dunking in a tank of hot water to loosen the hair and scurf and then putting the carcass through a mechanical dehairing machine where it is subjected to a beating action of scrapers. In the scalding of the carcass, the temperature of the water and the time and manner of dunking must be carefully controlled not only for the purpose of getting a uniform scald but to avoid over- or under-scalding. Over-scalding is usually manifested by emulsified backs and white blotches on the skin of the carcass. This is caused either by the water being too hot in the tub or the dehairing machine, or by the carcasses remaining in the water longer than necessary. The white blotches on the skin are excessively gluey, and generally result in torn skins due to the beater action of the scraper blades. Badly over-scalded hogs have to be skinned and trimmed, causing money losses through decreased yields and increased direct labor costs. Further, only the skins of properly scalded hogs can be used by tanners. Under-scalding is usually manifested by excessive hair and scurf on the hog carcasses coming out of the dehairing machine, making singeing and shaving difficult and expensive. The presence of any scurf on a carcass indicates either too rapid scalding, or low or irregular temperatures of the water in the dehairing machine or scalding tub. Under-scalded raw hogs, like over-scalded hogs, cause excessive production line stoppages, added cleaning labor, carcass mutilations from trimming, and lowered grading. Without thorough scalding carcasses cannot be satisfactorily cleaned at a uniform cost per hundred weight.

In the dehairing operation, it is not only necessary to remove the hair stems, but also desirable to eliminate the hair roots. The failure to eliminate the hair roots from a carcass is usually due to under-scalding which necessitates shaving and singeing. While the shaving and singeing may remove the hair stems, the roots are still left in the hide and a carcass having a sizable quantity of hair roots is non-uniform in its color and appearance. Therefore, the animal carcass is graded lower and the price obtainable for the heat therefrom is less. Further, the mere necessity for shaving and singeing increases the processing cost and reduces the prices which the hide will bring when sold to tanners for processing into leather.

According to my invention, many of the aforementioned shortcomings of present dehairing processes can be substantially overcome by treating the carcass in a particular manner whereby the hair roots are loosened without dunking the carcass in a tank of water. By my method the entire carcass is subjected to uniform conditions of pressure, temperature and humidity to bring about a loosening of the hair follicles to a degree heretofore unobtainable. By virtue of this improvement in the loosening of the hair follicles, it is possible to remove the hair from the carcass without subjecting it to the beating action of blades in a mechanical dehairing machine. That is, after pretreatment the hair stems with the roots attached can be removed by the action of jet streams, such as water, air and/or steam. Thus, the necessity for shaving and singeing can be eliminated along with the disadvantages attendant therewith as hereinbefore described.

It is, therefore, an object of this invention to provide an improved process for the removal of filamentary keratinous material from an animal carcass.

It is another object of this invention to provide a process for loosening hair roots from the follicles on animal carcasses.

Still another object of this invention is to provide an apparatus for loosening the filamentary keratinous materials on animal carcasses.

Further and additional objects of this invention will become obvious from the following detailed description taken with the accompanying drawing in which:

Figure 1 is an elevation, partly in cross-section, showing one embodiment of my apparatus wherein a cylindrical device specially fitted to accommodate animal carcasses rotates about a horizontally disposed axis;

Figure 2 is a cross section taken through the cylindrical device along the line 2—2 of Figure 1;

Figure 3 is a longitudinal section of another embodiment of my apparatus wherein the cylindrical device rotates about a vertically disposed axis;

Figure 4 is a plan view, partly in section, of this same embodiment;

Figure 5 is a longitudinal section through the chamber of an apparatus in which the hog carcass is dehaired by the action of jets; and Figure 6 is a top sectional plan of the same apparatus.

In accordance with my invention, the animal carcass is subjected, for a period of at least 5 seconds and not more than 6 or 7 minutes, to a temperature in the range of 125 to 500° F. and a total pressure of from 20 to 100 lbs. per square inch absolute, said absolute pressure being supplied either in part or in toto by water vapor. The pressure of the water vapor can be as low as 4 and as high as about 100 pounds per square inch absolute. However, when hot air is the principal pressurizing medium, it should be completely saturated with water vapor and it is preferred to have a fine mist of water present during the treatment. It will be understood that the higher temperatures are employed for the shorter periods of time and vice versa. It will also be appreciated that the conditions to which the carcass is subjected will vary depending upon the kind and size of the animal and also the season during which it is being processed. At certain times of the year the hair is thicker on the carcass than at other times. For an average 200 lb. hog being processed during the spring of the year, I prefer to subject the carcass to a temperature of about 150–170° F. for about ½ to 3 minutes with a total pressure of about 30 lbs. per square inch absolute having a partial water vapor pressure of about 15 lbs. per square inch absolute.

By subjecting the carcass to the aforementioned conditions, it is believed that the air and/or moisture at the proper temperature and under pressure permeate the follicles on the carcass and dissolve the substance binding the hair root. Thus, when the hair stem is subsequently subjected to a mechanical action, the root comes out along with the stem. By virtue of this loosening of the hair roots it is possible to remove them along with the stems merely by subjecting the carcass to the action of high pressure jet streams, such as water, air and/or steam. One of the practical limitations with respect to the use of mechanical dehairing machines is that it is extremely difficult, if not impossible, to have the entire surface of the carcass subjected to the beating action of the scraper blades. Further, the beating action tends to break the hair stems having roots still firmly embedded in the hide.

It is to be understood that the process of my invention is not limited to the situation where the hair is ultimately removed from the carcass through the use of high pressure jet streams, although this is my preferred embodiment. Other dehairing devices can be employed which will operate more efficiently by virtue of the improved loosening of the hair follicles. The uniformity of dehairing through the use of my process results in substantial money savings due to the elimination of certain direct labor charges and the decreased time necessary for the operation.

Another of the features of my invention is that it is possible to carry out the loosening process in equipment much smaller in size than the huge scalding tanks used in present processes. Thus, smaller space requirements for the operation are possible. Further, with the elimination of complex mechanical dehairing machines, a high maintenance cost is also removed.

Referring now to the drawing, embodiments of apparatus for carrying out my loosening process will be described in detail. In Figures 1 and 2, hogs 10 proceed along the bleeding rail 11 to chute 12 where they slide into the one open end of peripheral chamber 13 of cylindrical means 14. Cylindrical means 14 rotates about shaft 15 driven by motor 16. Each of the peripheral chambers 13 are fitted with small longitudinally disposed bars 17 to keep the carcass raised from the inner walls of the chamber. The rotation of cylindrical means 14 is timed with the dropping of hogs down chute 12 and is preferably intermittent to allow time for this operation. The end of each of the peripheral chambers facing away from chute 12 is closed. Thus, it will be seen that each peripheral chamber 13 opens longitudinally on the peripheral surface of cylindrical means 14 and on the side facing chute 12. Circumscribing all of the opening including the open end and longitudinal opening of each of the peripheral chamber 13 is gasket or sealing means 20 which engages stationary arcuate closure means 21 upon rotation to provide a pressure seal for each chamber opening thereunder. Extending through arcuate closure means 21 are inlet means 22, 23 and 24 for the admission of steam, air and water mist to pressurize each chamber opening thereunder. The amounts of air, steam and water mist admitted through inlets 22, 23 and 24 will be predetermined in accordance with the conditions of pressure, temperature and humidity to which the carcass is to be subjected. The admission can be timed with the intermittent rotation of cylindrical means 14. Gasket means 20 can be constructed of any suitable material, such as bearing metal, hard rubber, plastic or the like, and is tightly secured to cylindrical means 14 so that when engaging the under side of arcuate closure means 21 a pressure-tight seal is maintained within the chambers opening thereunder until they reach the end of the closure means. At that time hog 10 falls out of chamber 13 onto chute 24 where it is picked up and passed to subsequent dehairing.

Arcuate closure means 21 is preferably constructed of steel and is shaped so that the open ends and corresponding longitudinal openings in each of the peripheral chambers will be covered as the rotation proceeds. When closure means 21 and cylindrical means 14 are machined to close tolerances, it is possible to eliminate gaskets 20.

Figures 5 and 6 of the drawing illustrate an embodiment of the apparatus in which the hog carcasses may be subjected to the action of high pressure jets of water to remove the hair from the carcass. Each carcass is picked up and shackled and proceeds along rail 30 which extends through an elongated chamber 31 provided with a plurality of jets 32 which are directed preferably at an angle of about 45° downwardly at each carcass as it proceeds along rail 30. The jets are arranged in such a manner that they are directed at substantially the entire surface area of each carcass and the chamber is provided with turning bars 37 and 38 to rotate the carcass as it proceeds. The bottom of chamber 31 may be fitted with a screen 33 to collect the hair and filter it out of the water which proceeds through pipe 34 to chamber 35 for settling before recirculation by means of pump 36 to jets 32.

Figures 3 and 4 of the drawing illustrate an embodiment somewhat similar to that illustrated in Figures 1 and 2, except that the axis of the rotating cylindrical means is vertically disposed. Other differences are apparent from the drawing.

Hogs 40 proceed along bleeding rail 41 to cylindrical rotating means 42 which is provided with a plurality of peripheral chambers 43 opening longitudinally on the peripheral surface of cylindrical means 42. Cylindrical means 42 rotates about vertically disposed shaft 43 which is driven by means not shown. Disposed lengthwise down the peripheral surface of cylindrical means 42 are a plurality of gasket means 45, securely attached thereto, and arranged to engage stationary arcuate closure means 46 which extends almost completely around cylindrical means 42. The bottom and top of each peripheral chamber 43 is closed and the edges extend outwardly to engage closure means 46 so that on rotation any of the peripheral chambers coming thereunder will be entirely closed and pressure tight. Extending through arcuate closure means 46 are inlet means 50, 51 and 52 for the admission of steam, air and water mist to each chamber as its opening contacts same. As each of the peripheral chambers 43 is heated, pressurized and moisturized and the hog contained therein subjected to the treatment of the steam, air and mist, the cylindrical means 42 rotates, and as each of the chambers reaches the end of arcuate closure means 46, the pressure is lost and the hog carcass is removed on rail 53 which connects with rail 30, Figures 5 and 6, leading into the dehairing apparatus. It will be appreciated that the dehairing operation should take place as soon as possible after treatment with steam, air and moisture so as to avoid unnecessary cooling of the carcass. Each of the peripheral chambers 43 is fitted with a rail 54 upon which the hog carcass is hung during the treatment in the apparatus. The rotation of the apparatus can be intermittent so that as one hog is admitted from rail 41 into a peripheral chamber 42 another hog is removed, after having been treated, onto rail 53. The intermittent operation can be controlled by means of a timing switch, not shown, so that each hog will be subjected to conditions of temperature, pressure and moisture for a period of time sufficient to carry out the process. Further, the admission of steam, air and mist to the chamber can also be controlled by means of the same timing switch.

While this invention has been described and exemplified in terms of its preferred modifications, those skilled in the art will readily appreciate that many modifications can be made without departing from the spirit and scope of the invention.

I claim:

1. A process for the removal of filamentary keratinous material from an animal carcass comprising subjecting said carcass to a temperature in the range of 125 to 500° F. and a total pressure of 20 to 100 pounds per square inch absolute and a partial water vapor pressure of at least 4 pounds per square inch absolute, for a period of at least 5 seconds and subsequently subjecting said carcass to a mechanical dehairing action to remove the loosened filamentary material.

2. A process for the removal of hair from a hog carcass comprising subjecting said carcass to a temperature of from 125 to 500° F. and a total pressure of 20 to 100 pounds per square inch absolute and a partial water vapor pressure of 4 to about 100 pounds per square inch absolute, for a period of from 5 seconds to 7 minutes and subsequently subjecting said carcass to the action of a high pressure jet stream to remove the loosened hair filaments.

3. In the removal of filamentary keratinous material from an animal carcass, the step of loosening said material prior to removal by subjecting said carcass to a temperature of 125 to 500° F. and a total pressure of 20 to 100 pounds per square inch absolute and a partial water vapor pressure of at least 4 pounds per square inch absolute for a period of at least 5 seconds.

4. In the removal of hair from a hog carcass, the step of loosening said hair prior to actual removal by subjecting said carcass to a temperature of 125 to 500° F. and a total pressure of 20 to 100 pounds per square inch absolute and a partial water vapor pressure of from 4 to about 100 pounds per square inch absolute for a period of from 5 seconds to 7 minutes.

5. In the removal of filamentary keratinous material from an animal carcass, the step of loosening said material prior to removal by subjecting said carcass to a temperature of about 150 to 170° F. for about one half to three minutes with a total pressure of about 30 pounds per square inch absolute having a partial water vapor pressure of about 15 pounds per square inch absolute.

6. A process for the removal of filamentary keratinous material from an animal carcass comprising subjecting said carcass to a temperature in the range of 125 to 500° F. in a total pressure of 20 to 100 pounds per square inch absolute and a partial water vapor pressure of at least 4 pounds per square inch absolute, for a period of at least 5 seconds and subsequently subjecting said carcass to a hydraulic dehairing action to remove the loosened filamentary material.

References Cited in the file of this patent

UNITED STATES PATENTS

| | | |
|---|---|---|
| 1,383,347 | Stallman | July 5, 1921 |
| 2,085,856 | McKee et al. | June 22, 1937 |
| 2,084,857 | McKee et al. | June 22, 1937 |
| 2,100,299 | Tobin | Nov. 23, 1937 |